Aug. 22, 1944.  W. C. THOMPSON  2,356,363
CAMERA
Filed May 10, 1943
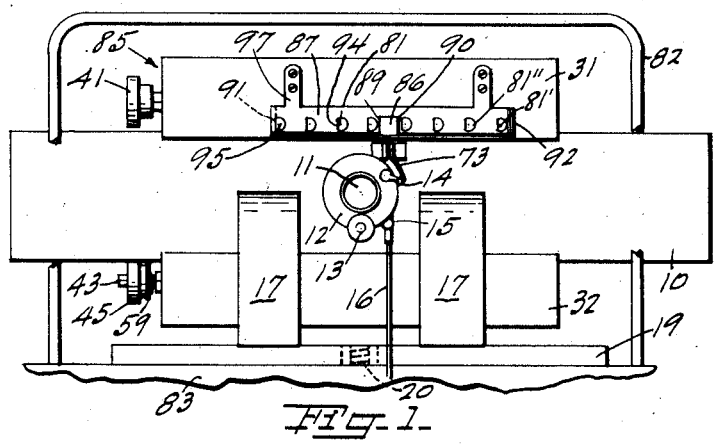
Fig. 1.
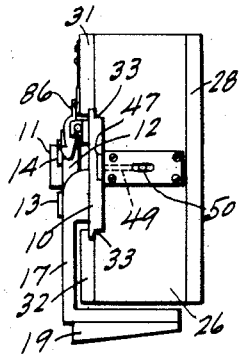
Fig. 2.
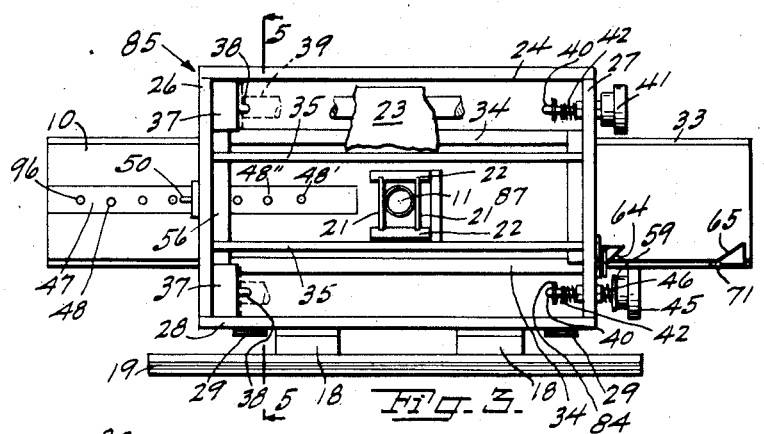
Fig. 3.
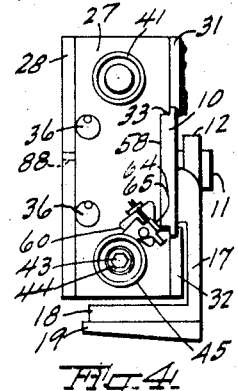
Fig. 4.
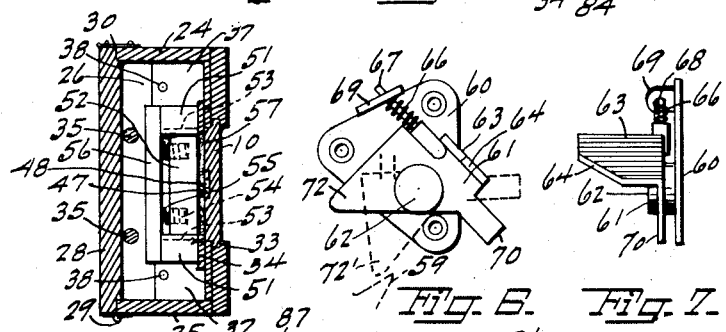
Fig. 5.  Fig. 6.  Fig. 7.
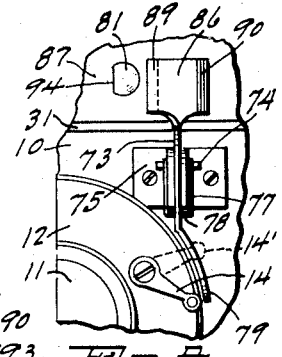
Fig. 8.
Fig. 9.  Fig. 10.
INVENTOR
William C. Thompson
By Philip A. Friedel
ATTORNEY Patented Aug. 22, 1944

2,356,363

UNITED STATES PATENT OFFICE 2,356,363

CAMERA

William C. Thompson, Oakland, Calif.

Application May 10, 1943, Serial No. 486,439

10 Claims. (Cl. 95—37)

This invention, a camera for making exposures in series both, longitudinally and transversely, on a roll of film, is designed particularly for making identification, pass-port, and similar photographs. It can obviously be used for taking regulation photographs, particularly for the multiple photo processes used in concessions at resorts and playgrounds.

It is known that multiple exposure cameras have been made for taking right-angular series of photographs; however, this invention is an improvement over all known types previously used, in that perfect light seals are provided, and any possibility of twice exposing any specific frame or any series of frames is entirely eliminated.

The main object of the invention is to provide a camera which will take a considerable number of photographs in two series at right angles to each other on a roll of film.

Another object of the invention is to provide means operating automatically to lock the camera against twice exposing the same frame, and permit exposures only in a predetermined direction and sequence in a series of frames.

A further object of the invention is to provide means operating automatically to lock the camera against either, twice exposing any specific frame or any series of frames, and require the starting of any series of exposures always from the same side of the film.

A further object of the invention is to provide means operating automatically to lock the camera against operation after the last frame in a transverse series has been exposed, and require the adjustment of the film for a new series to release the camera for adjustment to its initial or starting position, and require adjustment to the starting position before another exposure can be made.

In describing the invention, reference will be made to the accompanying drawing, in which:

Fig. 1 is a front elevation of the invention.

Fig. 2 is a right end elevation of Fig. 1.

Fig. 3 is a rear elevation with the rear door open to show the interior construction and arrangement.

Fig. 4 is a right end elevation of Fig. 3 and left end elevation of Fig. 1.

Fig. 5 is a section taken on line 5—5 of Fig. 3.

Fig. 6 is an enlarged elevation of the automatic lens board lock.

Fig. 7 is a side elevation of Fig. 6.

Fig. 8 is an enlarged front elevation of the shutter lock.

Fig. 9 is a right hand elevation of Fig. 8.

Fig. 10 is an enlarged fragmentary section through the cam plate ends, showing the release lever cam in an intermediate and two terminal positions.

The camera consists of a lens board 10 in which a lens 11 with automatic shutter 12 is mounted and which shutter is provided with the customary speed indicator 13, release lever 14, and cable release coupling 15 for connection of the cable release 16. This lens board 10 is supported by two brackets 17 to which it is fixedly secured, and these brackets terminate at the lower end in a foot member 18 for mounting on any suitable support 19, and which support 19 may be supplied, if desired with the usual nut 20 for cooperation with the conventional tripod screw.

A light chamber is mounted on the back of the lens board 10 in axial registry with the lens 11, and consists of side walls 21 and top and bottom walls 22, forming a frame for the specific area of the film to be covered by a single exposure, and extends back virtually to the focal plane and just clearing the face of the film 23, and forms a light-tight enclosure.

The camera or film housing consists of top and bottom walls 24 and 25, end walls 26 and 27, a rear door 28 shown hinged at 29 with the upper end releasably secured by clasps 30, and upper and lower front panels 31 and 32. The cooperative edges of the front panels 31 and 32, and lens board 10 are rabbetted as indicated at 33 for sliding longitudinal movement of the lens board relative to the housing, and the length of the lens board as shown is about twice the length of the housing. Additional cleats 34 cooperate with the interior surfaces along the rabbets to form a light-tight sliding connection.

Rotatably mounted with the rear peripheries coincident with the focal plane are two rollers 35 vertically spanning the light chamber 21—22 and over which rollers the film 23 passes and by which, in conjunction with the rear door, the film is supported in the focal plane. These rollers are suitably retained against longitudinal movement by socket bearings at one end and by caps or plates 36 at the other end, and are mounted at both ends in suitable bearings of conventional construction for free and easy rotation.

Mounted at one end interiorly of the film housing is a pair of vertically spaced film spool supports consisting each of a block 37 with a projecting pivot 38 to fit in the axial hole in the end of the film spool 39.

Mounted at the other end and passing through the end wall in axial alignment with one of the pivots 38 is a retractable pivot 40 which fits in the axial hole at the other end of the film spool, and which pivot is provided with a knob 41 for retraction of the pivot for insertion or removal of the spool, and a spring 42 for urging the pivot into the axial hole in the spool.

Similarly mounted through the same end wall but in axial alignment with the other pivot 38 is a second retractable pivot combining therein a key and a clutch; being similar to the first mentioned retractable pivot with the exception that the outer end of the pivot stem, instead of being fixed in the knob, is free, and non-circular in form as shown at 43, and a passage of similar shape is formed through a plate 44 which is secured to the outside of the knob 45. A spring 46 urges the knob outwardly with the plate 44 beyond the end of the stem, under which conditions the knob rotates freely on the stem, but when the knob is depressed the stem passes through the passage 43 clutching the knob and stem, and thus the key will be rotated by the knob, and which key, when located in the transverse slot in the end of the film spool will rotate the spool and wind the film from the upper to the lower spool. Secured on the inner end of this knob is a lever or star wheel which rotates with the knob and functions as a release as will hereinafter be described.

Mounted on the inside of the lens board and extending inwardly from one end almost to the light chamber is an indexing plate 47 which is provided with a series of indents spaced a distance equal to the span of the frame to be exposed, and substantially equal to the width of the light chamber. Mounted on the side of the housing wall is a latch 49 provided with a release 50 and which latch is spring urged to cooperate with the face of the indexing plate and project into the indents 48 to lock the lens board in each frame position transversely of the film.

Mounted at each end interiorly of the housing is a light seal comprising blocks 51 which are grooved to receive tongues on the sliding block 52 as indicated at 53. The sliding block 52 is provided with spring pockets 54 to receive and retain the springs 55 which seat against the fixed block 56. The front end of the sliding block 52 has a light proof sealing pad 57 extending throughout its length and which is pressed into contact with the inner surface of the lens board by the springs, thus preventing leakage of any light along the line of contact 58 between the end walls and lens board.

The lens board lock is mounted in cooperative relation to the lens board and on the side wall of the housing and also in cooperative relation to the lever or star wheel 59 which is secured on the inner end of the knob 45.

This lens board lock consists of a base 60 on which is pivotally mounted a toggle lever 61 with its pivot at 62. This lever has a cam 63 projecting at right angles and having a cam face 64 which is normally retained in a position cooperative to the cam 65 which is mounted adjacent the end of the lens board, and thus retained by the spring 66 with its link 67 which slides through a passage 68 formed through the ear 69 on the base 60. Additionally formed on this lever 61 is a lock bar 70 for engagement in the slot 71 formed in the under surface of the cam member 65, and also a resetting arm 72 for cooperation with the lever or star wheel 59, the lever 61 being retained in the respective positions 72 and 72' by the spring 66.

The shutter lock is to be adapted to the specific type of shutter used. As illustrated, the shutter 12 is of the automatic type with a timing indicator 13, release lever 14, and cable connection 15, and is illustrated with the shutter inverted so that the cable drops normally to obviate any possibility of kinking of the cable.

For normal operation of this type of shutter, depression of the release lever, or of the plunger on the cable release which simultaneously depresses the release lever, creates the exposure. When the release lever, or the plunger on the cable is released, the release lever automatically returns to its normal position, resetting the shutter for another exposure. So long as this release lever is retained in a depressed position, the shutter cannot be operated. With a rush of work or other distracting circumstances, the operator might readily forget to shift the film relative to the lens, or may forget whether he actually exposed the frame which is, at the instant in registry with the light chamber.

The shutter lock illustrated makes certain that no such errors can occur, because if the instant frame has already been exposed, the shutter will not operate, and the lens cannot be aligned with any frame which has already been exposed. In conjunction with the lens board lock, the same transverse series of frames cannot be exposed a second time.

The shutter lock merely consists of a means which will retain the shutter in an unset condition after an exposure has been made, and until the film has been adjusted to a new position, and which adjustment releases the shutter to reset for exposure of the next frame.

The arrangement shown consists of a lever 73 which is pivoted at 74 in a bracket 75, and which bracket has a shoulder 76 to function as a stop for the lever through cooperation with the spring 77 which passes through the lever at 78 and which urges the lower end 79 of the lever outwardly, with the hook 80 in position to engage the release lever 14 when the release lever is moved to the position 14' for making an exposure. At the other end the lever 73 is formed to cooperate with the upper front panel 31, cam heads 81, and the cam plate which will hereinafter be further described.

The operation of the invention is as follows: The camera is normally used with a stand on which it is mounted, with the camera at one end and a frame-type finder 82 at the other end. The subject to be photographed stands with his chest against the other end of the stand 83, and the stand is raised or lowered to locate the bust and head of the subject within the finder 82.

The spool 39 of film 23 is loaded between the upper pivots 38 and 40 and fed onto an empty spool locked between the lower pivots 38 and 40 with the transverse member 84 functioning as a key which fits in the slot in the end of the film spool, the springs 42 urging these latter pivots 40 and keys 84 into the holes and slots. The film passes over the backs of the rollers 35 and close to the back of the light chamber 21—22.

The door 28 is closed. The housing 85 is adjusted and locked to the lens board 10 by the locking member 70 with the housing located at the right hand end of the lens board, viewing Fig. 3. In this position the plunger 49 is located slightly to the right of the first indent 48', and cam 86 on lever 73 just clears the right hand end of the cam plate 87, viewing Fig. 1, and as indicated at 86' in Fig. 10.

Knob 45 is next depressed and turned counterclockwise to roll the film 23 onto the empty spool until the starting index on the back of the film registers in the index window 88, and coincidentally the star wheel 59 engages the lever 72 and throws it from the position 72' to its normal position 72, Fig. 6, releasing the locking member 70 from the recess 71 in the cam 65, and thus releasing the housing for adjustment relative to the lens board. The housing is next moved to the left, viewing Fig. 3 until the plunger 49 catches in the first indent 48'. The cam 86 is underbeveled at 89 and top beveled at 90, while the cam plate is underbeveled at 91 and top beveled 92. In adjusting the housing from its locked position to its first indexing position 48', the underbevel 89 rides over the top bevel 92, over the end of the cam plate and over the first cam button 81' which forces the cam 86 out and retracts the hook 80, releasing the release lever 14 which returns from the position 14' to the position 14, Fig. 8, resetting the shutter.

Operation of the release lever 14 or the cable release 16 makes the exposure of the first frame with the release lever simultaneously caught by the hook, creating a non-operative condition of the shutter.

The plunger 49 is again retracted and the housing is adjusted to the next index position, indent 48''. During this adjustment the cam 86 rides from between the cam buttons 81' and 81'', over button 81'' into the next space between buttons, again releasing the release lever for another operation of the shutter to expose the second frame. Thus each frame is exposed throughout the transverse series. The housing can only be adjusted in the one direction, because if an attempt is made to adjust it in the opposite direction, the edge 93 on the cam 86 will catch on the vertical face 94 on the cam button and lock the housing against adjustment in that direction.

As the last cam button 95 passes under the cam 86 it releases the release lever for the final exposure in the series of frames, and the cam 86 drops over the edge of the cam plate to rest on the front panel 31, with the plunger 49 in the last indent 96. When the shutter is operated, this final frame is exposed and the shutter is locked.

To start a new series of frames across the film, the plunger 49 is retracted and the housing is moved all the way back to its original position. The bevel 90 on cam 86 rides under the bevel 91 on the cam plate, lifting the cam plate against the urgence of the spring members 97, and during this shift of the housing the cam 86 rides on the front panel 31, under the cam plate, finally emerging beyond the end 92, with the housing and lens board again locked together, requiring adjustment of the film for a new series of frames to again release the housing from the lens board, and, as the housing is adjusted back to where plunger 49 engages the first indent 48', the cam button 81' has passed under the cam 86, releasing the shutter for the first exposure in the second transverse series on the roll of film.

I claim:

1. A camera including a housing having film supporting and transporting means, a lens board of greater length than said housing and slidably mounted in the front of said housing for relative horizontal adjustment, a lens and shutter combination mounted in said lens board and a light chamber centered with said lens and projecting rearwardly to the focal plane of said lens, and locking means for retaining said shutter inoperative following operation thereof and means for releasing said shutter for operation when said lens board and housing are relatively adjusted in one direction, and functioning as positive stop means for said lens board and housing against relative adjustment in the other direction; said film transporting means including a manually rotatable member, locking means including a cam having a recess and mounted on said lens board and a pivoted cam including a latch member and mounted on said housing and cooperatively related to and actuated by said cam during the terminal movement of said housing relative to said lens board to interlock the lens board and housing against relative movement through engagement of said latch member in said recess, and actuated by depression and rotation of said manually rotatable member through engagement with and operation of said pivoted cam to release said latch member from said recess as the film is transported by said manually rotatable member to a new position at right angles to the direction of adjustment between said housing and said lens board.

2. A camera comprising a lens board and a film housing slidably associated for relative adjustment, a shutter and lens combination mounted in said lens board, shutter operating means, and locking means locking said shutter against subsequent operation and actuated by operation of said shutter and including means actuated by relative movement of said housing and lens board for releasing said shutter for subsequent operation, and further including means limiting adjustment to one direction, second locking means actuated by terminal adjustment of said lens board and housing for locking said lens board and housing against relative adjustment, film transporting means and releasing means actuated thereby for releasing said second locking means for adjustment of said lens board and housing to their initial position and including means in said shutter locking means for maintaining the locked condition of said shutter while the lens board and housing are adjusted to their initial position.

3. A camera comprising; a lens board and a film housing slidably connected and relatively adjustable and including indexing means for locking said lens board and housing in any one of a series of relative positions, a lens and shutter combination mounted in said lens board, adjusting means for adjusting film at right angles to the path of adjustment of said lens board and housing, shutter operating means and shutter locking means cooperatively related to said shutter operating means and associated with said lens board and said housing for locking said shutter against subsequent operation when the shutter is operated and including releasing means for releasing said shutter for subsequent operation when said lens board and housing are relatively adjusted in one direction and forming stop means against relative adjustment in the other direction; lens board locking means associated with said lens board and housing for locking said lens board and housing against relative adjustment when said lens board and housing have reached their limit of relative adjustment in one direction, said adjusting means including manually operable means for simultaneously adjusting said film and releasing said lens board locking means for manual adjustment of said lens board and housing to their initial relative positions, and said shutter locking means including means for bypassing said releasing means on said shutter locking means to retain the locked condition of said shutter operating means while said lens board and housing are adjusted back to their initial relative positions.

4. A camera comprising; a housing, and a lens board horizontally adjustable thereon for making a series of exposures transversely of a film, and a lens and shutter combination mounted in said lens board and having a release lever; a series of cams having each a cam surface on one side and an abutting edge on the other side and supported by said housing parallel to said lens board; a spring urged lever having a latch arm for engagement with said release lever upon depression thereof, and having a cam arm to ride over the cam surface of a cam to release said latch arm from said release lever when said lens board and housing are relatively adjusted in one direction, and to engage the abutting edge of a cam to prevent relative retrograde adjustment of said lens board and said housing when said lens board and housing are urged for adjustment in the other direction; a support member releasably retained against the front of said housing and having cam ends and having said cams thereon; said cam arm having a cam surface formed on each side edge to respectively cooperate with one cam surface to raise the support member and ride thereunder while the lens board and housing are returned to their initial relative positions to retain the locked condition of said shutter, and to cooperate with the other cam surface to ride over the support member for cooperation with said cams in sequence for the next series of exposures.

5. A camera comprising; a housing, and a lens board horizontally adjustable thereon for making a series of exposures transversely of a film, and a lens and shutter combination mounted in said lens board and having a release lever; a series of cams having each a cam surface on one side and an abutting edge on the other side and supported by said housing parallel to said lens board; a spring urged lever having a latch arm for engagement with said release lever upon depression thereof, and having a cam arm to ride over the cam surface of a cam to release said latch arm from said release lever when said lens board and housing are relatively adjusted in one direction, and to engage the abutting edge of a cam to prevent relative retrograde adjustment of said lens board and said housing when said lens board and housing are urged for adjustment in the other direction; locking means for locking said lens board and said housing against relative adjustment when the last of a series of exposures has been made comprising; a first cam having a latch recess and fixed on said lens board; a second cam having a latch arm and a release arm and pivotally mounted on said housing in cooperative relation to said first cam, with said first cam actuating said second cam to urge said latch arm into engagement with said recess during the terminal relative adjustment of said lens board and housing; and film winding means having an arm in cooperative relation to said release arm for releasing said latch arm from said recess to release the lens board and housing for relative adjustment to their initial position for another series of exposures.

6. A camera comprising; a housing, and a lens board horizontally adjustable thereon for making a series of exposures transversely of a film, and a lens and shutter combination mounted in said lens board and having a release lever; a series of cams having each a cam surface on one side and an abutting edge on the other side and supported by said housing parallel to said lens board; a spring urged lever having a latch arm for engagement with said release lever upon depression thereof, and having a cam arm to ride over the cam surface of a cam to release said latch arm from said release lever when said lens board and housing are relatively adjusted in one direction, and to engage the abutting edge of a cam to prevent relative retrograde adjustment of said lens board and said housing when said lens board and housing are urged for adjustment in the other direction; a plate resiliently retained against the face of said housing and including said series of cams on the outer face thereof, and having the respective ends of the plate beveled under and over; said cam arm having its sides complementarily beveled to ride under and over the respective ends; whereby, during relative adjustment of said lens board and said housing to their initial relative positions, said cam arm will ride under said plate to maintain the locked condition of said shutter, and ride over said plate and be released by the first of said cams when said housing and lens board are relatively adjusted for the first exposure of the next series.

7. In a camera having a slidably mounted lens board and a lens and shutter combination mounted in said lens board, and manually releasable means for locking said lens board against relative adjustment in each of a series of positions for making a series of exposures throughout the width of a film; means for adjusting the film for successive series of exposures; means for locking said shutter against operation following each exposure throughout a series; releasing means for releasing said shutter for operation with each relative adjustment of said lens board throughout a series, and including means maintaining the locked condition of said shutter during relative adjustment of said lens board from the last of one series of exposures to the first of a following series of exposures.

8. A structure as defined in claim 7; locking means for locking said lens board against relative adjustment following the last of a series of exposures, and releasable through adjustment of the film for another series of exposures, comprising; a cam member mounted on said camera; a second cam member mounted on said lens board; said cam members including cooperative latching means moved into cooperation through terminal adjustment of said lens board following the last of a series of exposures, through cooperation between said cam members; and means associated with said means for adjusting said film for releasing said locking means when said film is adjusted for the next series of exposures.

9. A structure as defined in claim 7; and means locking said lens board against retrograde adjustment throughout a series of exposures, and including means releasing said lens board for retrograde adjustment to its initial position for another series of exposures with adjustment of said lens board following the last exposure of a series.

10. A camera, in combination, roll film adjusting means; a housing having a lens board slidably adjustable longitudinally thereof, and a lens and shutter combination mounted in said lens board, for making a series of exposures transversely of the film, and indexing means for said lens board; latching means for latching said shutter against operation following each exposure; releasing means for releasing said shutter for operation with each adjustment of said lens board and including positive stop means against retrograde adjustment of said lens board; locking means for locking said lens board against relative adjustment when said lens board has been adjusted to its terminal position following the final exposure of a transverse series; and means associated with said film adjusting means for releasing said locking means through adjustment of said film for another series of transverse exposures; and means associated with said releasing means for maintaining the latched condition of said shutter following the final exposure of a transverse series while said lens board is adjusted to its initial position for the first of another series of exposures.

WILLIAM C. THOMPSON.